United States Patent [19]

Rebours et al.

[11] Patent Number: 5,490,418
[45] Date of Patent: Feb. 13, 1996

[54] DEVICE FOR MEASURING THE FORCE EXERTED BY A GRID SPRING

[75] Inventors: Claude Rebours, Goux-les-Usiers; Gerard Barbe, Rueil Malmaison, both of France

[73] Assignee: Société Franco-Belge de Fabrication de Combustibles, Paris la Defense, France

[21] Appl. No.: 338,801

[22] Filed: Nov. 10, 1994

[30] Foreign Application Priority Data

Nov. 12, 1993 [FR] France ................... 93 13512

[51] Int. Cl.⁶ .................................................. G21C 17/00
[52] U.S. Cl. .................. 73/161; 33/502; 376/245
[58] Field of Search .............................. 73/161, 862.01; 33/502; 376/245, 247, 258

[56] References Cited

U.S. PATENT DOCUMENTS

| | | | |
|---|---|---|---|
| 4,196,048 | 4/1980 | Qurnell et al. | 376/245 |
| 4,246,783 | 1/1981 | Steven et al. | 73/161 |
| 4,420,455 | 12/1983 | Qurnell et al. | 376/245 |
| 4,668,466 | 5/1987 | Rylatt | 376/245 |
| 4,773,276 | 9/1988 | Baruffalo | 73/161 |
| 5,070,622 | 12/1991 | Batzin et al. | 33/502 |
| 5,259,119 | 11/1993 | Yoshioka et al. | 33/502 |
| 5,343,504 | 8/1994 | Gaylord, Jr. et al. | 376/247 |

FOREIGN PATENT DOCUMENTS 0501663  2/1992  European Pat. Off.
3242407  5/1984  Germany.

Primary Examiner—Richard Chilcot
Assistant Examiner—Ronald Biegel
Attorney, Agent, or Firm—Pollock, Vande Sande & Priddy

[57] ABSTRACT

A device for measuring the force exerted by a spring of a supporting grid on a fuel rod passing through the grid has an elongate body connected by two flexible blades that are parallel to the long direction to two respective beams insertable in a cell. At least one of the beams carries a force sensor designed to be pressed against the spring. A unit is slidable in the body along the body between a position in which it moves the beams apart while keeping them parallel to give them a spacing that corresponds to the nominal diameter of a fuel rod, and a position in which it allows the flexible blades to move the beams towards each other. The unit is movable at will between the two positions.

8 Claims, 3 Drawing Sheets

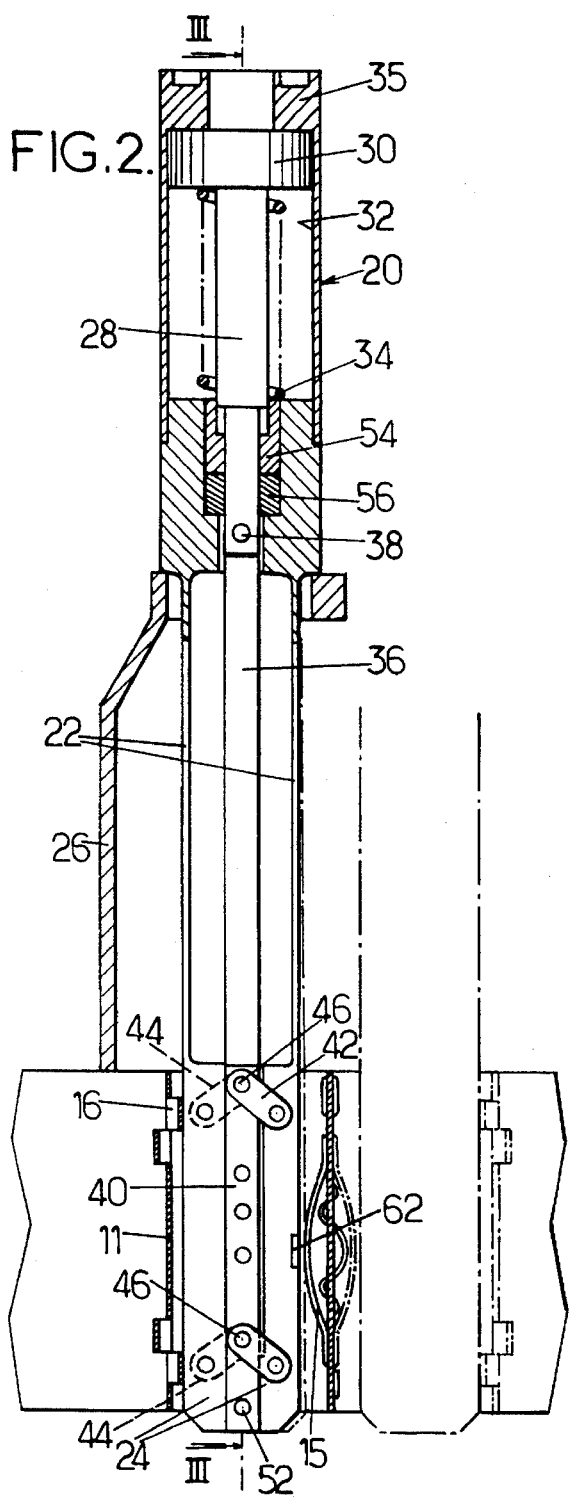
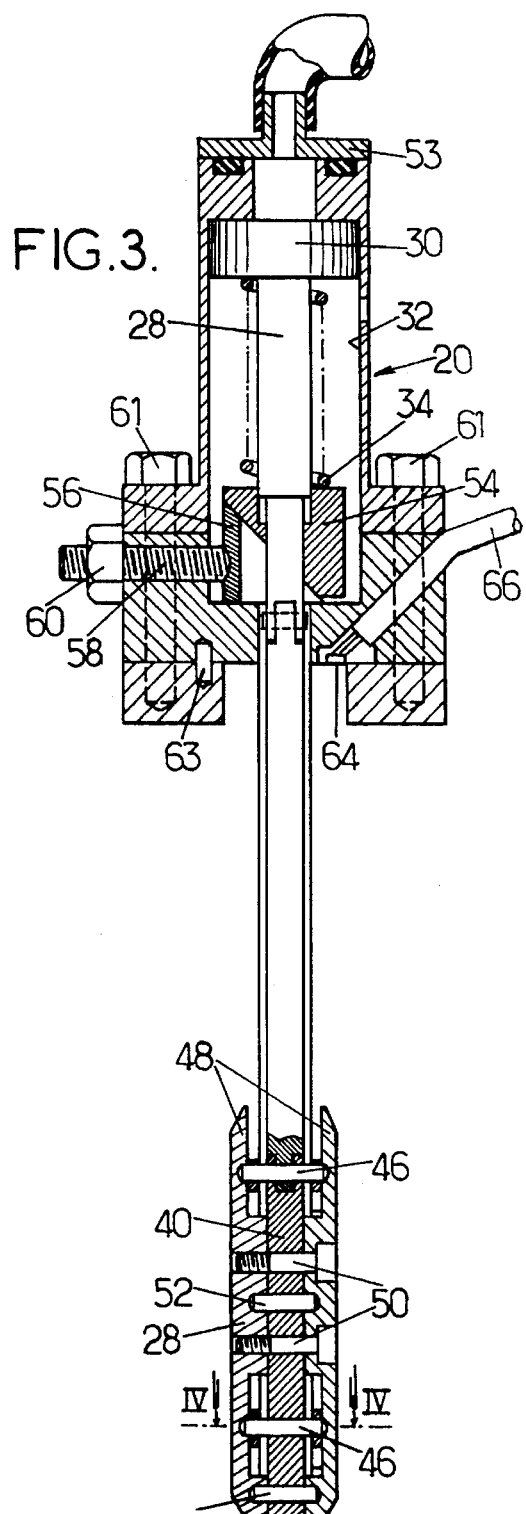
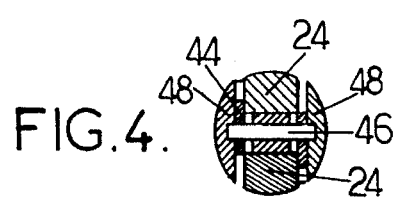

DEVICE FOR MEASURING THE FORCE EXERTED BY A GRID SPRING

BACKGROUND OF THE INVENTION

The present invention relates to a device for measuring the force exerted by a spring of a supporting grid on a nuclear fuel rod passing through the grid.

The fuel assemblies used in nuclear reactors that are cooled and moderated by water include support grids for supporting fuel rods and/or for holding them at the nodes of a regular array, generally a square array. The grid is often constituted by two sets of mutually crossed plates defining rod-receiving cells. Two facing walls in a given cell are organized so that one of them includes a rigid cell-engaging projections and the other includes a spring, often in the form of a hairpin, straddling a plate and intended to force the rod against the projections. The springs may be single, i.e. they may have a single resilient branch acting on one rod; or they may be double, i.e. they may have two branches each acting on a respective rod placed on a respective side of the plate carrying the spring.

It is important for the springs to exert forces on the rods that do not depart too far from a set value. Various devices have already been proposed for measuring the force exerted by a spring that is single or double, for the purpose of verifying that the force exerted by each spring of a grid lies within a predetermined range of values prior to incorporating the grid in an assembly.

For example, document EP-A-0 501 663 describes a device enabling the force exerted by a double spring to be measured; that device includes a gauge designed to be forced into a cell and including a feeler for transmitting the force exerted by a spring. The gauge is fixed to a centering peg which is designed to engage in the cell adjacent to that in which measurement is being performed and to retain the double spring therein. Forced insertion of the gauge and of the centering peg runs the risk of damaging the spring.

Document DE-A-3 242 407 describes another measuring device having a gauge of a diameter that is substantially equal to that of a fuel rod. A bore is provided in the gauge transversely to its axis at a location that faces the thrust point of the spring when the gauge is pushed home. The bore contains a piston whose outside face carries a measuring element. To measure the force of a spring, the gauge is inserted and hydraulic pressure is exerted on the piston to bring it into a determined position such that the width of the gauge level with the spring thrust point is equal to the nominal diameter of a fuel rod. Given that the piston is hardly capable of projecting from the gauge, it is not possible to completely eliminate friction while the gauge is being inserted and removed.

SUMMARY OF THE INVENTION

It is an object of the invention to provide an improved device for measuring the force exerted by a grid spring on a fuel rod. It is a more specific object to reduce the friction forces exerted on the spring whose characteristics are to be measured.

To this end, the invention there is provided a measurement device comprising: an elongate body connected by two flexible blades that are parallel to the long direction, to two respective beams designed to be inserted in a cell, at least one of the beams carrying a force sensor designed to be pressed against the spring; a unit slidable in the body along the body between a position in which it moves the beams apart while keeping them parallel to give them a spacing that corresponds to the nominal diameter of a fuel rod, and a position in which it allows the flexible blades to move the beams towards each other. Displacement means are provided for moving the unit at will between the two positions.

The means for displacing the moving equipment may be manual; but they will generally be motor driven. In particular they may be actuated by a pressurized fluid.

The movable unit may be of various different structures. In particular, it may comprise a connecting rod that is longitudinally displaceable by the displacement means and that is connected to the beams by arms in such a manner as to constitute a virtual deformable parallelogram that obliges the beams to remain parallel to themselves as they move apart or towards each other.

In another embodiment, the movable unit carries at least two sets of ramps co-operating with thrust means provided on the beams and constituting cams.

Whichever embodiment is adopted, the fact that the thrust surfaces of the beams remain parallel to themselves guarantees good contact between a force sensor carried by at least one of the beams and the spring whose force is to be measured.

The device may be doubled up, i.e. it may have two sets of beams so as to make it possible to perform measurements on double springs.

The invention will be better understood from the following description of particular embodiments given as non-limiting examples. The description refers to the accompanying drawings.

BRIEF DESCRIPTION OF THE DRAWINGS

FIG. 2 shows a first device of the invention in cross-section on a plane that includes its axis;

FIG. 3 is a view of the device in cross-section along line III—III of FIG. 2;

FIG. 4 is a cross-section on line IV—IV of FIG. 3;

DETAILED DESCRIPTION

Figure 1:
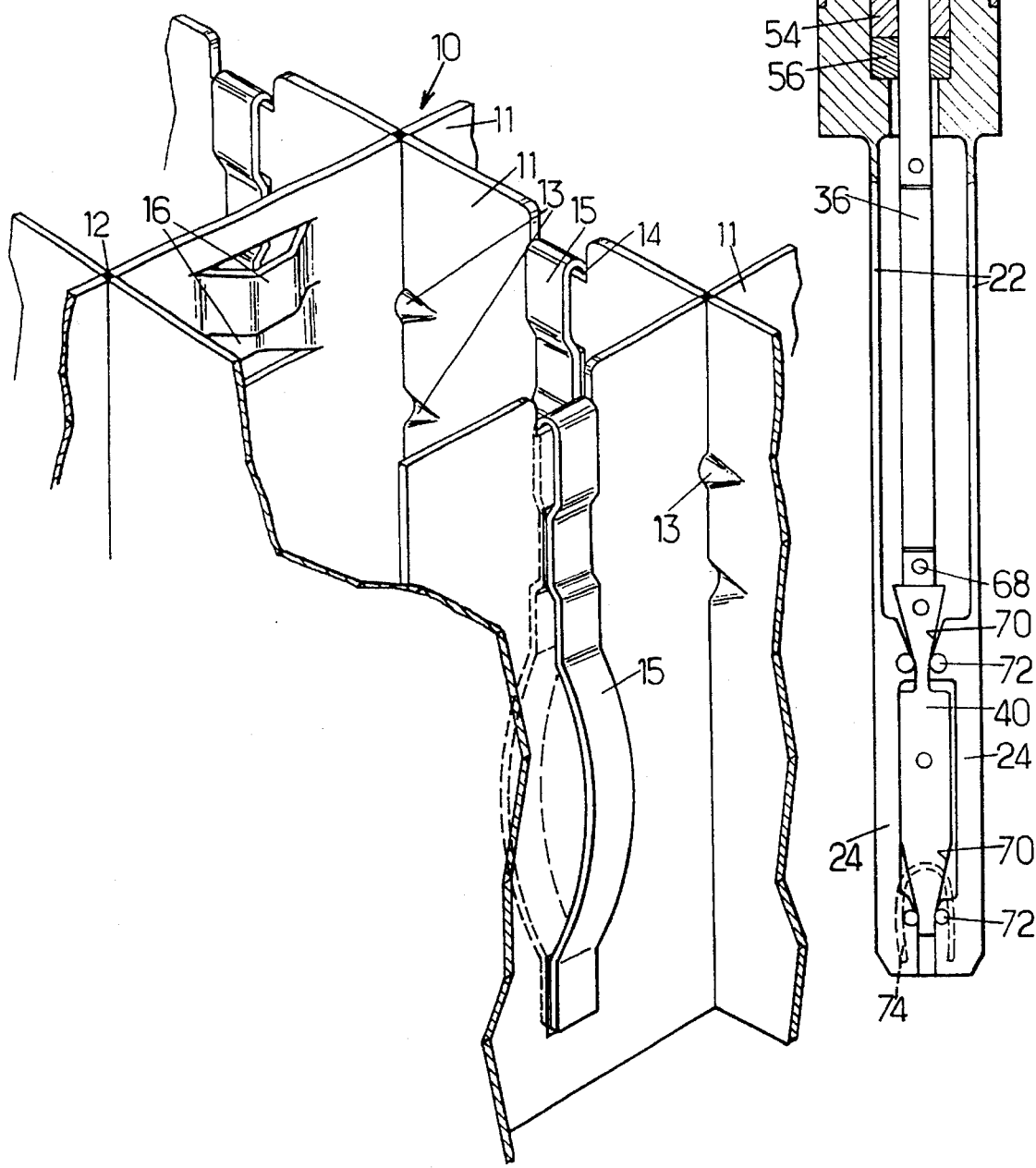
FIG. 1 is a diagram of a fragment of a grid for an assembly, including springs for which it is necessary to measure the forces that they exert on fuel rods.

The invention is described in its application to measurement of the pressure force exerted by grid springs supporting fuel rods at the nodes of a square array. As shown in FIG. 1, such a grid 10 may be constituted by two sets of mutually crossed plates 11 assembled together via interfitting half-depth slots. Once they have been engaged in one another, the plates are held in place e.g. by punched protrusions 13 and by weld spots 12 at the cross-points. The crossed plates define cells most of which receive fuel rods (not shown) and some of which are occupied by guide tubes belonging to the skeleton of a fuel assembly.

Each of the cells that receives a rod includes means for holding the rod in two orthogonal directions. In general, for each direction, these means comprise rigid abutment elements on one of the walls of the cell. In the example shown, the abutment elements are constituted by projections 16 located near the top and near the bottom of the wall. The holding means also comprise a spring 15 facing the projections and designed to cause the rod to exert a determined thrust force against the projection. The force must be large enough to prevent the fuel rods vibrating, but small enough to allow a fuel rod to slide in the event of thermal expansion.

The spring 15 shown in FIG. 1 comprises two "active" branches, i.e. branches designed to exert a holding force on a rod. However, the spring could have only one active branch, e.g. when mounted on a wall between a cell occupied by a rod and a cell designed to receive a guide tube, for example, as shown in FIG. 2. In either case, each rod is held at three points in one direction, and at three points in the direction orthogonal thereto.

The disposition described above is conventional. Embodiments may be found, for example, in documents EP-A-280 595 and U.S. Pat. No. 5,091,145.

The device shown diagrammatically in solid lines in FIGS. 2 to 4 is designed to measure the pressure force exerted by a single spring 15. The device is in the form of an elongate body 20 that is generally cylindrical in shape, and connected by two flexible blades 22 to two respective beams 24 having an outside surface that substantially reproduces a fraction of the surface of a fuel rod. The beams are of a length that is not less than the distance between the two abutment projections of a cell. To guarantee that the beams are accurately located in the grid, the body is advantageously fixed on a positioning cap 26 designed to bear against one of the major faces of the grid.

A unit that is movable in the elongate direction of the body enables the beams to be moved relative to each other between the position shown by solid lines in FIG. 2 and the position shown by chain-dotted lines. The moving equipment is designed to keep the beams parallel during such displacement. In the example shown in FIGS. 2 and 3, the movable unit is actuated by fluid pressure means. In a simplified embodiment, those means could be manual.

As shown, the fluid pressure means comprise a piston 30 mounted in a bore 32 formed in the body. The piston 30 is subjected to the action of a return spring 34 urging it against the end wall 35. The piston 28 is coupled by a pin 38 to a connecting rod 36 which extends between the blades 22. The connecting rod 36 is hinged to a slider 40 connected to each of the beams 24 by a set of arms 42 and 44 constituting a deformable parallelogram. In the example shown in FIGS. 2 and 3, the arms are mounted on the slider 40 about pins 46 which are also engaged in side plates 48. The two side plates are fixed to each other by screws 50. Pegs 52 may also be used to hold the side plates 48 in position relative to each other.

When the piston 30 contacts the end wall of the bore in which it moves, the arms 42 retain the beams inwardly so that they take up a volume such that the set of beams can be inserted in a cell without friction. When fluid pressure is applied against the piston, e.g. via a nozzle 53, the movable unit moves downwards and deforms the parallelogram in a direction that causes the beams 24 to move apart from each other.

The spacing imparted to the beams by the piston should correspond to the size of a fuel rod. The device shown by way of example in FIGS. 2 and 3 includes adjustment means enabling that result to be achieved. The adjustment means comprise a bush 54 capable of sliding on a small diameter length of the connecting rod 36, serving to fix the amplitude d of displacement available to the piston starting from its rest position. The longitudinal position of the bush 54 which receives the pressure from the return spring 34 is set by a wedge 56 that is displaceable transversely to the rod 36 by means of an adjustment screw 58 passing through the body and capable of being locked by means of a nut 60.

The body 20 is generally made up of a plurality of mutually assembled parts which, in the examples of FIGS. 2 and 3, comprise a cylinder for receiving the piston and a base which are fixed together by screws 61. These screws may also serve to secure the stop-forming cap 26 that is positioned relative to the base by pegs 63.

The beam 24 designed to come into contact with the spring 15 caries a measuring element 62 such as a piezo-electric gauge or a strain gauge, connected by wires (not shown) to a connector 64 for coupling to an outlet cable 66.

Operation of the device can be seen directly from the above description. While the piston is not subjected to a fluid pressure force, the device is inserted with appropriate orientation into a cell fitted with a spring whose force is to be measured. Since the beams are close together, insertion takes place without significant friction. The length of the cap 26 is such that when its spacer comes into contact with the large face of the grid, the measurement element 62 is facing the portion of the spring 15 that projects furthest. Fluid is then fed to the nozzle 53, thereby causing the piston rod 28 to move downwards until a shoulder thereof comes into abutment against the bush 54 which has been set so that the spacing of the beams is then equal to the diameter of a fuel rod. A measurement is taken. Fluid is then allowed to discharge through the nozzle 53 and the device is withdrawn.

When the device is designed to measure the force exerted by a spring that has two active branches, like the spring shown in FIG. 1, and in chain-dotted lines in FIG. 2, two sets of blades 22 and beams 24 are provided which are actuated simultaneously by the same drive means, as shown in chain-dotted lines in FIG. 2.

Tests performed with a device of the above kind have shown that all of the operations required for measuring the force of the springs in a complete grid require no more than half an hour for a grid that needs 472 measurements.

Figure 5:
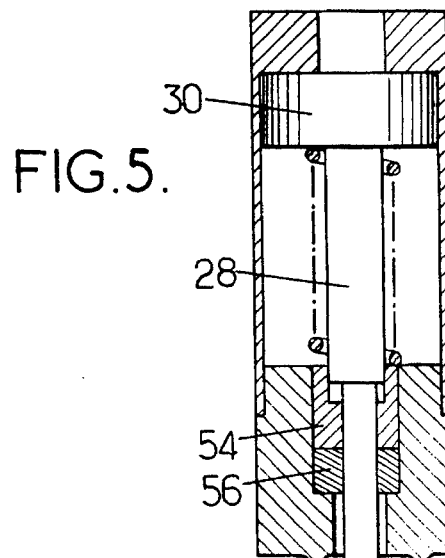
FIG. 5 is similar to FIG. 2 and shows another embodiment.

In the modified embodiment shown in FIG. 5, where members corresponding to those described above are given the same reference numerals, the arms 42 and 44 constituting a virtual deformable parallelogram in the example of FIG. 2 have been replaced by a set of cams and ramps.

The slider 40 connected to the connecting rod 36 via a fork and a pin 68 has two sloping ramps 70 facing each beam 24. Each beam carries two pins 72 constituting cams for following the profiles of the ramps. When the ramps are lowered from the rest position shown in FIG. 5, the beams are moved apart against the action of resilient return means that are constituted in the example shown by a tweezer-shaped spring urging the beams towards each other.

As in the preceding example, moving the movable unit downwards causes the beams to move apart while keeping them parallel to themselves, providing only that the resilient blades 22 are long enough to take up an S-shape while leaving all of the cams in contact with the corresponding ramps.

Figure 6:
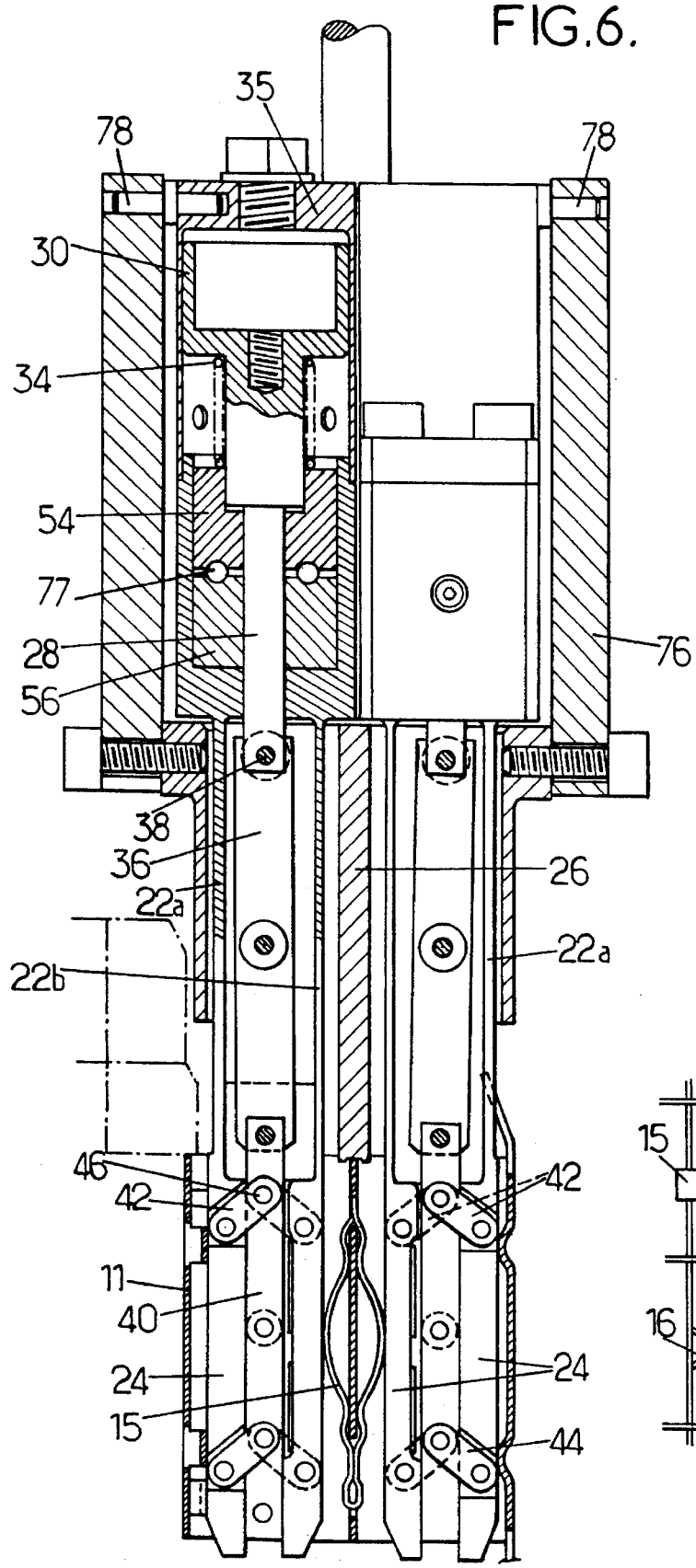
FIG. 6 is similar to FIG. 2 and shows a device for carrying out measurements in two cells simultaneously.
Figure 7:
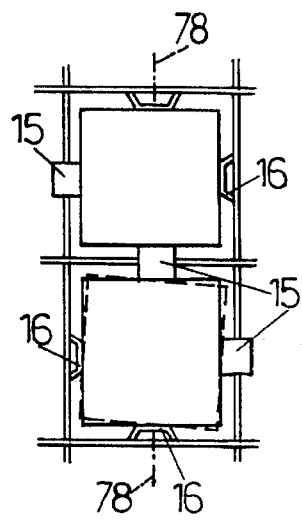
FIG. 7 is a diagrammatic plan view for showing the advantage of a doubled-up device of the kind shown in FIG. 6.

Although the embodiments shown in FIGS. 2 to 5 provide good results in cells that have two springs situated face to face, they can be less satisfactory when that condition is not satisfied. Under such circumstances, there is a danger of the beams taking up a skew position in the cell. FIGS. 6 and 7 show such a disposition. In each of two cells in FIG. 7, each spring 15 faces a rigid projection 16. Because the springs bend, the beams of a single-cell device run the risk of taking up an oblique position, as shown by a dashed outline.

This risk is eliminated with a two-cell device as shown in FIG. 6, where elements corresponding to those already described are given the same reference numerals.

The device of FIG. 6 can be considered as having two sets of beams and flexible blades, each secured to a body. The two bodies are carried by a common housing 76 made up of a plurality of assembled-together parts, and having an extension 26 that constitutes a stop and that bears against a grid plate between the two assemblies. The bush 54 can rest against the wedge 56 via slideways 77 that reduce friction.

Each of the assemblies is connected to the housing 76 by a peg 78 which constitutes an axis of rotation orthogonal to the axes of the pins 38 and 46, also designated 78 on FIG. 7. In other words, the assemblies can pivot about respective axes placed close to their top ends and parallel to the beam-separation direction. The assemblies can also be offset angularly, each to one side of the vertical, in such a manner that the beams take up the position shown in solid lines in FIG. 7 and therefore provide an accurate measurement regardless of the bending of the springs 15.

In the embodiment of FIG. 6, the outer blade 22a of each assembly is thicker than the inner blade 22b and is less flexible. When the slider 40 is pushed in, then the inner beam bears against the double spring 15 before the outer beams begin to move away so as to press against the projections 16. The dimensions of the device are such that the beams are inserted into the cells without friction when the slider is raised.

The device shown in FIG. 6 can be used as shown for measuring the force of a double spring, or only one of its sets can be used in conjunction with a single spring.

We claim:

1. A device for measuring a force which would be exerted by a spring of a supporting grid on a fuel rod of set diameter passing through the grid, comprising: an elongate body; a pair of flexible blades parallel to the direction of elongation and connecting the body to a pair of respective beams insertable in a cell, a force sensor connected to at least one of the beams for contact against the spring; a unit slidable in and along the body between a position in which it moves the beams apart while keeping them parallel to give them a spacing that corresponds to said set diameter, and a position in which it allows the flexible blades to move the beams towards each other; and means moving said movable unit at will between said two positions.

2. A device according to claim 1, wherein said unit comprises a longitudinally displaceable connecting rod connected to the beams by arms that make up a virtual deformable parallelogram.

3. A device according to claim 1, wherein said unit comprises at least two sets of ramps co-operating with cams provided on the beams.

4. A device according to claim 1, wherein said displacement means have adjustment elements limiting a stroke thereof and limiting an extent by which the beams may spread apart to an amount equal to said set diameter.

5. A device according to claim 4, wherein the adjustment elements comprise a stop-forming bush longitudinally displaceable and limiting the amount of displacement away from a rest position of an assembly belonging to the moving unit and comprising a piston and a piston rod, and a wedge for bearing against the bush and enabling the longitudinal position thereof to be adjusted.

6. A device according to claim 1, for measuring a force exerted by a double spring having two active branches, one on either side of a common cell wall, said device comprising two sets each having one said pair of beams and one said pair of flexible blades, carried by a common housing.

7. A device according to claim 6, wherein the two sets are independently mounted on the common housing by means enabling them to pivot about an axis parallel to a direction along which the beams can spread apart.

8. A device according to claim 6, wherein an outer one of said blades in each set is less flexible than an inner one of said blades thereof and said inner blade is designed to bear against the double spring.

\* \* \* \* \*